(12) United States Patent
Awad Alla et al.

(10) Patent No.: US 11,091,106 B2
(45) Date of Patent: Aug. 17, 2021

(54) HYBRID POWER NETWORK FOR A VEHICLE

(71) Applicant: Ford Global Technologies, LLC, Dearborn, MI (US)

(72) Inventors: Michael Adel Awad Alla, Novi, MI (US); Sami Dagher, Dearborn, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/248,426

(22) Filed: Jan. 15, 2019

(65) Prior Publication Data

US 2020/0223383 A1 Jul. 16, 2020

(51) Int. Cl.
| | | |
|---|---|---|
| *B60R 16/03* | (2006.01) | |
| *G07C 5/08* | (2006.01) | |
| *B60W 10/20* | (2006.01) | |
| *B60W 10/18* | (2012.01) | |
| *B60W 30/18* | (2012.01) | |

(52) U.S. Cl.
CPC .............. *B60R 16/03* (2013.01); *B60W 10/18* (2013.01); *B60W 10/20* (2013.01); *B60W 30/18* (2013.01); *G07C 5/08* (2013.01); *B60W 2420/42* (2013.01); *B60W 2420/52* (2013.01); *B60W 2710/18* (2013.01); *B60W 2710/20* (2013.01)

(58) Field of Classification Search
CPC .......... B60R 16/03; B60W 2050/0292; B60W 10/20; B60W 10/18; B60W 30/18; B60W 2710/20; B60W 2420/52; B60W 2420/42; B60W 2710/18; G07C 5/08
See application file for complete search history.

(56) References Cited

U.S. PATENT DOCUMENTS

| | | |
|---|---|---|
| 8,996,284 B2 | 3/2015 | Polimeno et al. |
| 9,352,635 B1 * | 5/2016 | Schepmann ............ B60L 58/12 |
| 2005/0135124 A1 † | 6/2005 | Diaz Guerra Mora et al. |

(Continued)

FOREIGN PATENT DOCUMENTS

| | | |
|---|---|---|
| DE | 102016112764 A1 | 1/2018 |
| DE | 102016215564 A1 † | 2/2018 |

(Continued)

OTHER PUBLICATIONS

Wang, Y-J. and Lee, M-H. "A Method for Balancing a Single-Phase Loaded Three-Phase Induction Generator." Pub.Sep. 13, 2012, Energies, 5, pp. 3534-3549. (Year: 2012).*

(Continued)

*Primary Examiner* — Peter D Nolan
*Assistant Examiner* — Tanya C Sienko
(74) *Attorney, Agent, or Firm* — Frank A. MacKenzie; Bejin Bieneman PLC

(57) ABSTRACT

A vehicle power network includes a bus providing power to an automotive safety integrity level (ASIL)-rated load and an auxiliary-rated load. The ASIL-rated load includes a processor and memory storing instructions executable by the processor. The instructions include, to, in response to determining a minimal risk condition (MRC), selectively terminate power to the auxiliary-rated load.

18 Claims, 9 Drawing Sheets

(56) References Cited

U.S. PATENT DOCUMENTS

| | | | |
|---|---|---|---|
| 2007/0152502 A1* | 7/2007 | Kinsey | H02J 1/14 |
| | | | 307/10.1 |
| 2012/0245794 A1† | 9/2012 | Aragai et al. | |
| 2012/0280644 A1† | 11/2012 | Lind et al. | |
| 2014/0067192 A1† | 3/2014 | Yousuf | |
| 2018/0029474 A1* | 2/2018 | Berels | B60L 58/21 |
| 2018/0043789 A1† | 2/2018 | Goetz | |
| 2018/0208064 A1 | 7/2018 | Wortberg et al. | |
| 2018/0259966 A1† | 9/2018 | Long | |
| 2018/0297609 A1* | 10/2018 | Bozsik | B60W 50/023 |
| 2018/0370540 A1* | 12/2018 | Yousuf | B60W 50/023 |

FOREIGN PATENT DOCUMENTS

| | | | |
|---|---|---|---|
| EP | 3146605 B1 † | 10/2018 | |
| WO | 2007135304 A1 | 11/2007 | |
| WO | 2016110353 A1 | 7/2016 | |

OTHER PUBLICATIONS

Fujita, Yoshikazu "Development of Battery Management System", Fujitsu Ten Tech. J. No. 42 (2016) pp. 68-80 (Year: 2016).*

\* cited by examiner
† cited by third party

|  | MRC 2 | | MRC 3 | |
|---|---|---|---|---|
|  | MRC 2A | MRC 2B | MRC 3A | MRC 3B |
| Responsible Entity/System | AVS | AVS | AVS | ABS<br>PSCM |
| Vehicle Behavior | Pull Over to a suitable location | Pull Over Immediately | Stop Along Path | Stop Now |
| Maximum Time Domain | Estimate of 5 minutes | ≤ 30 seconds | ≤ 30 seconds minus time spent in 2B | Based on vehicle speed (Approx 0.3g deceleration rate) |
| Brief Description | AVS pulls over in a suitable location (e.g. parking space etc.) | AVS pulls vehicle over immediately | AVS stops in lane immediately | ABS applies 0.3g deceleration and PSCM ramps steering torque to zero to bring the vehicle to a stop |
| Failure Examples | 1. Brake Redundancy Faults<br>2. Steering Redundancy Faults | 1. Low Voltage Power Faults<br>2. AVS or CAVS faults | 1. Low Voltage Power Faults<br>2. AVS or CAVS faults | 1. AVS and CAVS faults |

FIG. 6

HYBRID POWER NETWORK FOR A VEHICLE

BACKGROUND

A vehicle may comprise a vehicle power system to provide power for various electrical functions. The vehicle power system typically includes a bus, a power source, and various loads, wherein the power source provides electricity to power the loads.

BRIEF DESCRIPTION OF THE DRAWINGS

FIG. 6 is a table of example fault conditions and responses.

DETAILED DESCRIPTION

Figure 1:
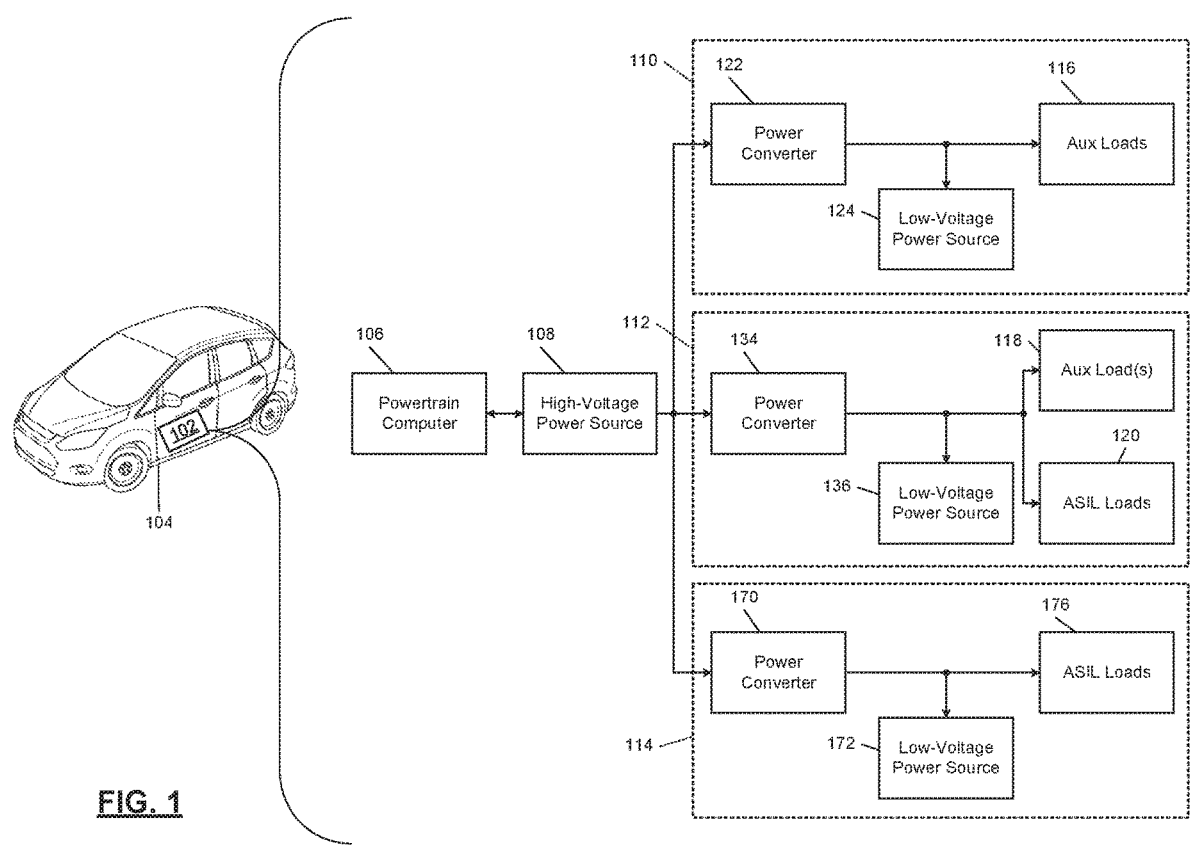
FIG. 1 is a schematic diagram of an example vehicle power network.

According to one example, a vehicle power network includes a bus providing power to an automotive safety integrity level (ASIL)-rated load and an auxiliary-rated load. The ASIL-rated load includes a processor and memory storing instructions executable by the processor. The instructions include, to, in response to determining a minimal risk condition (MRC), selectively terminate power to the auxiliary-rated load.

According to the at least one example set forth above, the ASIL-rated load may control vehicle steering or vehicle braking.

According to the at least one example set forth above, the ASIL-rated load may receive sensor data from at least one of a LIDAR sensor, a camera sensor, and a radar sensor; and may use the sensor data to control an autonomous mode of a vehicle.

According to the at least one example set forth above, the instructions may further, based on the MRC, control a vehicle to a stop.

According to the at least one example set forth above, the vehicle power network further comprises a power converter that converts voltage from a first direct current voltage to a second direct current voltage.

According to the at least one example set forth above, the vehicle power network further comprises a hybrid power network that includes the bus, the ASIL-rated load, and the auxiliary-rated load, where the vehicle power network may include a base power network including additional auxiliary-rated loads, where the hybrid power network and the base power network may be load-balanced within a predetermined threshold.

According to the at least one example set forth above, the vehicle power network further comprises a redundant power network that may provide redundant power to the ASIL-rated load of the hybrid power network during a single-point fault.

According to the at least one example set forth above, the instructions may further include actuating a switch to terminate power to the auxiliary-rated load.

According to the at least one example set forth above, the vehicle power network, where the MRC may be determined based on at least one of (i) a fault condition of the auxiliary-rated load, and (ii) a fault condition of a power converter.

According to the at least one example set forth above, the vehicle power network further comprises a current sensor that measures current draw of the auxiliary-rated load, where the instructions may further, based on the current draw, determine the fault condition of the auxiliary-rated load.

According to one example, a vehicle power network including a bus provides power to a plurality of auxiliary-rated loads each coupled to the bus via a different switch. The bus provides power to a first automotive safety integrity level (ASIL)-rated load. The bus provides power to a second ASIL-rated load that is programmed to: determine a minimal risk condition (MRC); and then, actuate at least one of the switches to terminate power to a corresponding one of the plurality of auxiliary-rated loads.

According to the at least one example set forth above, the second ASIL-rated load may be programmed to: control vehicle steering, vehicle deceleration, or a combination thereof.

According to the at least one example set forth above, the second ASIL-rated load may be programmed to: receive sensor data from at least one of a LIDAR sensor, a camera sensor, and a radar sensor; and may use the sensor data to control an autonomous mode of a vehicle.

According to the at least one example set forth above, the second ASIL-rated load may be programmed to, in response to determining the MRC, control a vehicle to a stop.

According to the at least one example set forth above, the vehicle power network further comprises a power converter that converts voltage from a first direct current voltage to a second direct current voltage.

According to the at least one example set forth above, the vehicle power network further comprises a hybrid power network including the bus, the plurality of auxiliary-rated loads, the first ASIL-rated load, the second ASIL-rated load, and at least one of the switches. The vehicle power network may further include a base power network including additional auxiliary-rated loads, where the hybrid power network and the base power network may be load-balanced within a predetermined threshold.

According to the at least one example set forth above, the vehicle power network further comprises a redundant power network that may provide redundant power to the first and second ASIL-rated loads of the hybrid power network during a single-point fault.

According to the at least one example set forth above, the vehicle power network where the MRC may be determined based on at least one of (i) a fault condition of the plurality of auxiliary-rated loads, and (ii) a fault condition of a power converter.

According to the at least one example set forth above, the vehicle power network further comprises a plurality of current sensors that may measure current draw of a corresponding auxiliary-rated load, where based on the current draw, the second ASIL-rated load may be programmed to determine the fault condition of the corresponding auxiliary-rated load.

According to one example, a system of a vehicle including a first bus provides power to a first plurality of auxiliary-rated loads. The system includes a second bus providing power to a second plurality of auxiliary-rated loads each coupled to the second bus via a different switch. The second bus provides power to a first automotive safety integrity level (ASIL)-rated load. The second bus provides power to a second ASIL-rated load that is programmed to: determine a minimal risk condition (MRC) based on at least one of (i) a fault condition of the second plurality of auxiliary-rated loads, and (ii) a fault condition of a power converter; and then actuate at least one of the switches to terminate power to a corresponding one of the second plurality of auxiliary-rated loads.

Referring now to the figures, wherein like reference numerals designate like or similar devices and/or functions, a vehicle power network 102 is shown for a vehicle 104. According to the illustrated example, the vehicle power network 102 may comprise a powertrain computer 106 coupled to a high-voltage (HV) power source 108, a base power network 110, a hybrid power network 112, and a redundant power network 114, wherein the power networks 110, 112, 114 are coupled to and powered by the HV power source 108. In the illustrated figures, the base power network 110 comprises exclusively auxiliary-rated loads 116, while the hybrid power network 112 comprises a combination of auxiliary-rated load(s) 118 and automotive safety integrity level (ASIL)-rated loads 120. While examples are not shown here, ASIL-rated loads 120 typically are arranged on a dedicated power network (e.g., all loads having the same ASIL rating and not being mixed with loads having a QM-rating). It should be appreciated that using a dedicated power network of ASIL-rated loads may minimize risk of a power-related fault to the power network due to failure or excessive power demand of a non-ASIL-rated load. However, modern vehicles (e.g., such as vehicle 104) increasingly implement additional electronic devices to enhance the user-experience—and these additional electronic devices can contribute to a substantial quantity of auxiliary-rated loads 116, 118. Further, if all these auxiliary-rated loads 116, 118 are placed on a single power network (e.g., such as base power network 110), a substantial load imbalance would occur between the base power network 110 and a dedicated power network of ASIL-rated loads. Accordingly, the vehicle power network 102 disclosed herein utilizes the hybrid power network 112 (comprising both auxiliary-rated and ASIL-rated loads), maintains the respective ASIL ratings of the ASIL-rated loads 120 to promote vehicle and passenger safety, and concurrently achieves power-load balancing within a predetermined threshold (e.g., less than 220 amps).

FIG. 1 illustrates the vehicle 104 as a passenger vehicle; however, vehicle 104 could be any other suitable vehicle type, including a truck, a sports utility vehicle (SUV), a recreational vehicle, a bus, aircraft, marine vessel, or the like that comprises the vehicle power network 102. In at least one example, the vehicle 104 is configured to operate in at least one of a plurality of autonomous modes, as defined by the Society of Automotive Engineers (SAE) (which has defined operation at levels 0-5). For example, vehicle 104 may receive and process two- and/or three-dimensional data of its surroundings and further may be programmed and/or configured to store and execute logic instructions embodied in hardware, software, firmware, a combination thereof, or the like. This may enable vehicle 104 to operate with some user assistance (partial autonomy) or without any user assistance (full autonomy). For example, according to levels 0-2, a human driver monitors or controls the majority of the driving tasks, often with no help from the vehicle 104. For example, at level 0 ("no automation"), a human driver is responsible for all vehicle operations. At level 1 ("driver assistance"), vehicle 104 sometimes assists with steering, acceleration, or braking, but the driver is still responsible for the vast majority of the vehicle control. At level 2 ("partial automation"), vehicle 104 can control steering, acceleration, and braking under certain circumstances without human interaction. At levels 3-5, vehicle 104 assumes more driving-related tasks. At level 3 ("conditional automation"), vehicle 104 can handle steering, acceleration, and braking under certain circumstances, as well as monitoring of the driving environment. Level 3 may require the driver to intervene occasionally, however. At level 4 ("high automation"), vehicle 104 can handle the same tasks as at level 3 but without relying on the driver to intervene in certain driving modes. At level 5 ("full automation"), vehicle 104 can handle all tasks without any driver intervention.

The powertrain computer 106 may supply drive torque to wheels of the vehicle 104 based on, for example, an accelerator pedal and/or a gear shift lever position. For example, in a fully autonomous mode, the powertrain computer 106 may supply drive torque based on engine revolutions per minute (RPM). The powertrain computer 106 may also convert rotational kinetic energy produced by the wheels into electrical energy during braking (e.g., regenerative braking).

The electrical energy may be stored in the HV power source 108, such as a battery, ultracapacitor, supercapacitor, etc. In one example, the electrical energy provided by the HV power source 108 may be high-voltage direct current (DC). The HV power source 108 may be any type of power source suitable for providing high-voltage DC for operating the vehicle 104, such as lithium-ion, lead-acid, etc. The HV power source 108 may have a voltage rating of, for example, 220 volts, 250 volts, 300 volts, 400 volts, etc.

Figure 2:
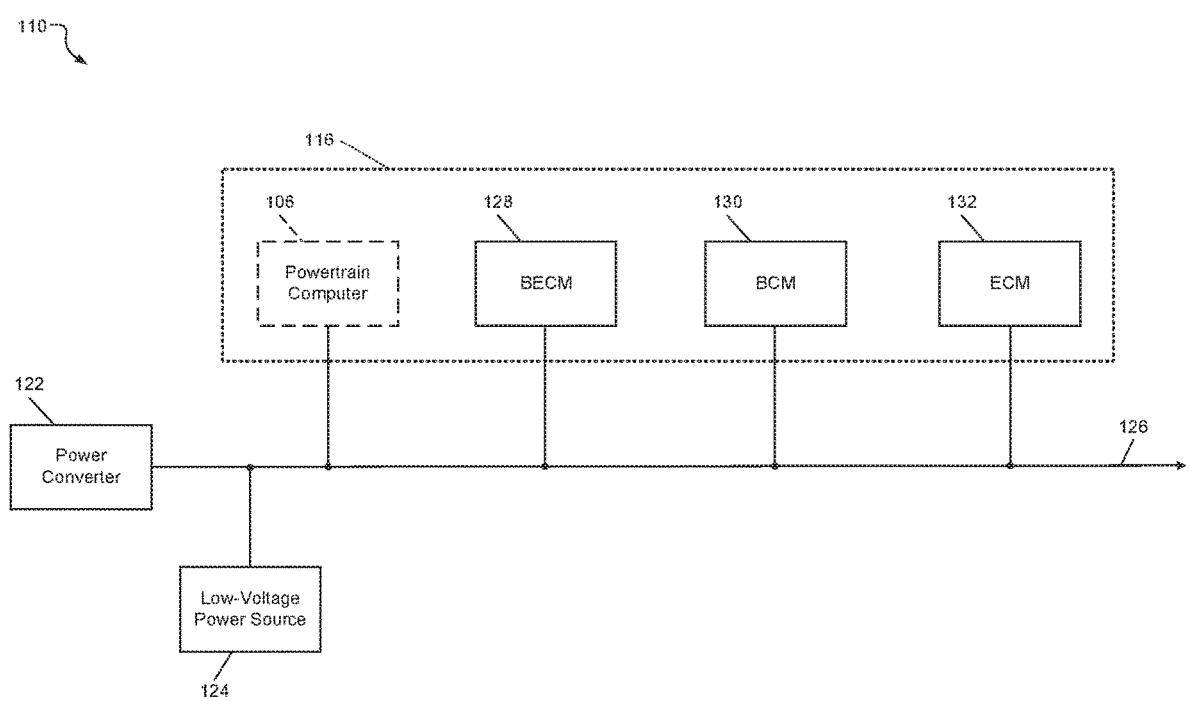
FIG. 2 is a schematic diagram of an example base power network.

As shown in FIGS. 1-2, the base power network 110 may comprise a power converter 122 coupled to the HV power source 108. Power converter 122 further may be coupled to a low-voltage (LV) power source 124 via a bus 126 that also provides power to the plurality of auxiliary-rated loads 116. The power converter 122 may be a direct-current to direct-current (DC/DC) converter that converts DC high-voltage power from the HV power source 108 to DC low-voltage power. Accordingly, this DC low-voltage power is supplied to the LV power source 124, the bus 126, and the auxiliary-rated loads 116.

This stepped-down low-voltage power may be stored in the LV power source 124, which may be a battery, capacitor, or the like. The LV power source 124 may be any type of power source suitable for providing low-voltage power for operating the auxiliary-rated loads 116, such as lithium-ion, lead-acid, etc. In operation, as the auxiliary-rated loads 116 draw power, the HV power source 108 and power converter 122 may recharge the LV power source 124. The LV power source 124 may have a voltage rating of, for example, 12 volts, 48 volts, etc. As used herein, a voltage rating refers to a nominal voltage which may have a predetermined range of variance. Non-limiting examples of voltage ratings include 12 volts ±10%, 48 volts ±10%, or the like.

The bus 126 may be any wired connection for providing vehicle power (e.g., such as a cable having any suitable gauge). Bus 126 delivers low-voltage power from the LV power source 124 to the auxiliary-rated loads 116. An auxiliary-rated load (e.g., such as auxiliary-rated loads 116) may correspond to a so-called QM-rated load as defined by International Organization for Standardization (ISO) 26262. Under ISO 26262, a QM-rated load means that the risk associated with a hazardous event is not unreasonable and does not dictate any safety requirements. In the present disclosure, an auxiliary-rated load does not comprise a primary ASIL-rated function. In some examples, the auxiliary-rated load includes some secondary ASIL-rated functions which include functions, such as acceleration, and other non-braking and non-steering related ASIL-rated functions. In one example, each of the auxiliary-rated loads 116 may be computers having a processor and memory. Non-limiting examples of auxiliary-rated loads 116 include the powertrain computer 106 (optional), a battery energy control module (BECM) 128, a body control module (BCM) 130, and an engine control module (ECM) 132. While the powertrain computer 106 is shown outside of auxiliary-rated loads 116 for illustrative purposes, it should be appreciated that, in at least one example, the auxiliary-rated loads 116 include the powertrain computer 106.

The battery energy control module 128 may control and monitor the HV power source 108. For example, the battery energy control module 128 may monitor temperature and state of charge of the HV power source 108. The battery energy control module 128 may communicate with and receive input from other vehicle computers over a communications network.

The body control module 130 may control locking and unlocking doors of the vehicle 104. Additionally, the body control module 130 may control exterior lighting of the vehicle 104, including headlamps, turn signals, brake lamps, and hazard lights. The body control module 130 may communicate with and receive input from sensors of other vehicle computers over a communications network.

The engine control module 132 may determine and process a requested amount of torque based on, for example, an accelerator pedal position, a brake pedal position, a gear shift lever (PRNDL) position, and/or autonomous vehicle (AV) inputs. The engine control module 132 may communicate with and receive input from other vehicle computers over a communications network.

While the auxiliary-rated loads 116 include the powertrain computer 106, the battery energy control module 128, the body control module 130, and the engine control module 132, other examples of auxiliary-rated loads exist.

Figure 3A:
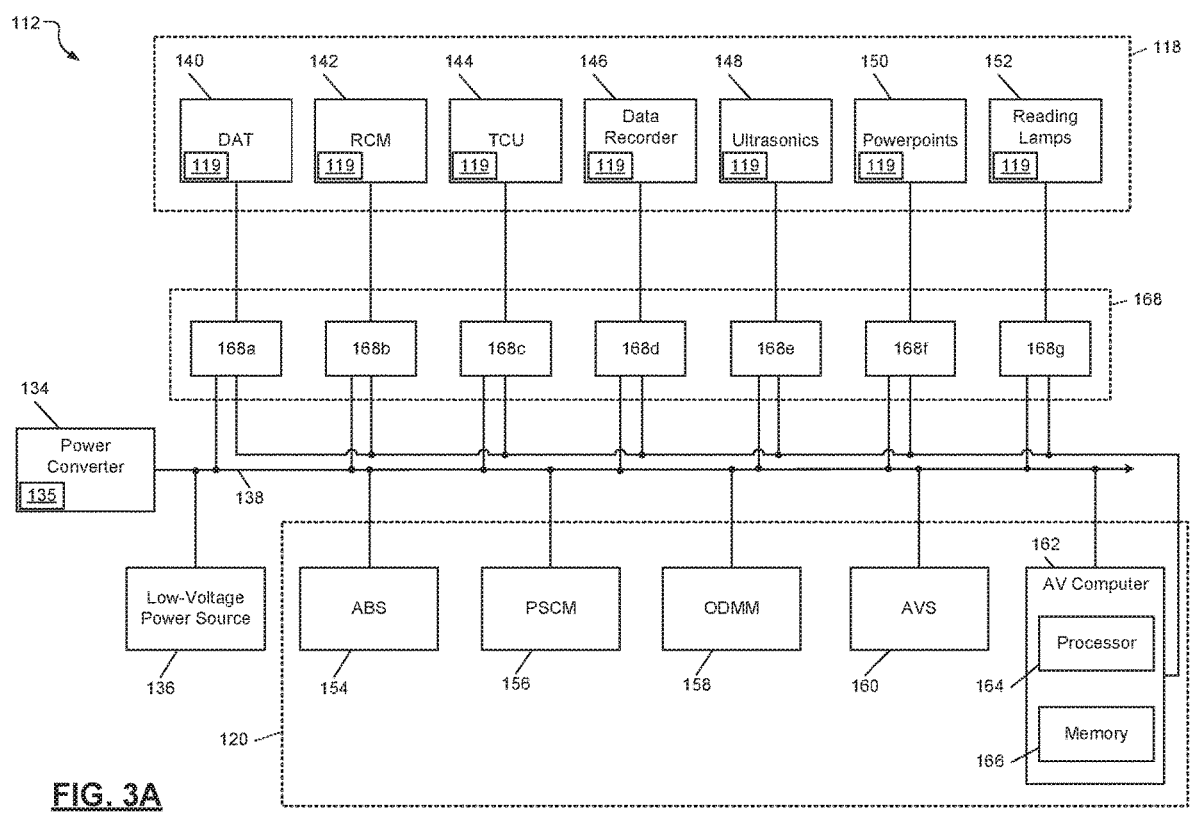
FIG. 3A is a schematic diagram of an example hybrid power network.

Turning now to FIGS. 1 and 3A, the hybrid power network 112 may comprise a power converter 134 coupled to the HV power source 108. Power converter 134 further may be coupled to a LV power source 136 via a bus 138 that also provides power to at least one auxiliary-rated load 118 via a switching circuit 168 and to one or more ASIL-rated loads 120. The hybrid power network 112 may be referred to as a hybrid power network because it includes a blend of auxiliary-rated load(s) 118 and ASIL-rated loads 120. In at least one example, the power converter 134 may be identical to the power converter 122, except that the power converter 134 is part of hybrid power network 112 (not base power network 110); therefore, it will not be re-explained here.

Similarly, LV power source 136 may be the same as LV power source 124, except that the LV power source 136 is part of hybrid power network 112 (not base power network 110); therefore, it will not be re-explained here. The LV power source 136 may have a voltage rating similar to LV power source 124. Similarly, in at least one example, bus 138 may be identical to the bus 126, except that the bus 138 is part of hybrid power network 112 (not base power network 110); therefore, it will not be re-explained here.

Turning now to the blend of auxiliary-rated load(s) 118 and the ASIL-rated loads 120, the auxiliary-rated load(s) 118 and the ASIL-rated loads 120 are powered via the DC low-voltage delivered over the bus 138. According to one example, the auxiliary-rated load(s) 118 may have the same ISO 26262 characteristics as those described above. Therefore, these auxiliary-rated loads will not be explained here in detail; however, additional non-limiting examples of auxiliary-rated loads that may be located on the hybrid power network 112 are described. Non-limiting examples of auxiliary-rated load(s) 118 include driver assist technology (DAT) 140, a restraint control module (RCM) 142, a telematics control unit (TCU) 144, a data recorder 146, ultrasonics 148, powerpoints 150, and/or reading lamps 152.

The driver assist technology 140 may be utilized by an advanced driver assistance system (ADAS) to assist the human driver during partial autonomy. The driver assist technology 140 may communicate with and receive input from other vehicle computers over a communications network.

The restraint control module 142 monitors and/or controls passive restraints, including seatbelts, airbags, pretensioners, pyrotechnic loads, etc., to mitigate injury to occupants of the vehicle 104. The restraint control module 142 may communicate with and receive input from other vehicle computers over a communications network (not shown).

The telematics control unit 144 may allow communication between the vehicle 104 and remotely-located servers (e.g., also known as cloud servers). The telematics control unit 144 may communicate with and receive input from other vehicle computers over the above-mentioned communications network. The telematics control unit may be, for example, a Bundle 5 modem.

The data recorder 146 records data, such as AV data, in response to a triggered event. The recorded data may be in compliance with guidelines, such as with SAE guidelines. The data recorder 146 may communicate with and receive input from other vehicle computers over the communications network described above.

The ultrasonics 148 monitors sound waves with frequencies higher than those audible to human hearing. For example, the frequency of the sound waves may be between 20 kilohertz and 5 gigahertz. The ultrasonics 148 may communicate with and receive input from other vehicle computers over the communications network described above.

The powerpoints 150 provide power to universal serial bus (USB) outlets. The USB outlets may be used to charge, for example, mobile devices, tablets, etc. The reading lamps 152 illuminate an interior of the vehicle 104.

While the auxiliary-rated load(s) 118 include driver assist technology 140, the restraint control module 142, the telematics control unit 144, the data recorder 146, ultrasonics 148, powerpoints 150, and/or reading lamps 152, other examples of auxiliary-rated loads exist.

As used herein, an ASIL-rated load (e.g., ASIL-rated loads 120, 176) comprise at least one primary ASIL-rated function which is degraded upon a single-point fault. As used herein, a primary ASIL-rated function is a function one wherein a respective computer controls a steering and/or braking function of the vehicle 104. In one example, the ASIL-rated loads 120 may correspond to an ASIL-B rating as defined by an ASIL rating system of ISO 26262, wherein an ASIL-B rated load has a single-point fault rate of less than $10^{-7}$ over the useful life of the vehicle 104. According to the ASIL rating system, an ASIL-A rated load dictates the lowest integrity; meanwhile, an ASIL-D rated load dictates the highest integrity. An ASIL-C rated load has a higher integrity than an ASIL-A rated load but a lower integrity than an ASIL-D rated load. Exemplary characteristics of a single-point fault will be understood by those skilled in the art. In one example, each of the ASIL-rated loads 120 may be computers having a processor and memory. Non-limiting examples of ASIL-rated loads 120 include an anti-lock braking system (ABS) 154, a power steering control module (PSCM) 156, an object detection maintenance module (ODMM) 158, an autonomous vehicle system (AVS) 160, and an autonomous vehicle (AV) computer 162.

The anti-lock braking system 154 may control braking of the vehicle 104 to slow and/or stop the vehicle 104. The anti-lock braking system 154 may include control of friction brakes, such as disc brakes, drum brakes, band brakes, etc.; regenerative brakes; any other suitable type of brakes; or a combination thereof. The anti-lock braking system 154 may communicate with and receive input from other vehicle computers over the communications network described above. For example, the anti-lock braking system 154 may receive input from the human driver via, e.g., a brake pedal.

The power steering control module 156 may control turning of the wheels through, for example, a rack-and-pinion system with electric power-assisted steering, a steer-by-wire system, or any other suitable steering system. The power steering control module 156 may communicate with and receive input from other vehicle computers over the communications network mentioned above. For example, the power steering control module 156 may receive input from the human driver via, e.g., a steering wheel.

The object detection maintenance module 158 may monitor a condition of external sensors, such as radar sensors, scanning laser range finders, light detection and ranging (LIDAR) devices, and image processing sensors such as cameras. The object detection maintenance module 158 may communicate with and receive input from other vehicle computers over the communications network described above. For example, the object detection maintenance module 158 may command a washer nozzle to spray washer fluid to clean the external sensors.

The autonomous vehicle system 160 may monitor the environment in which the vehicle 104 is operating in, plan a future path of the vehicle 104, and command steering, acceleration, and braking. The autonomous vehicle system 160 may communicate with and receive input from other vehicle computers over the above-mentioned communications network.

The AV computer 162 may include a processor 164 and memory 166. According to one example, processor 164 may be any type of load capable of processing electronic instructions, non-limiting examples including a microprocessor, a microcontroller or controller, an application specific integrated circuit (ASIC), etc.—just to name a few (in other examples, the processor 164 may comprise an electronic circuit of discrete components arranged to execute vehicle logic or the like). As will be apparent from the description that follows, the AV computer 162 may be programmed to carry out at least a portion of the process described herein. For example, among other things, the AV computer 162 can be programmed to execute digitally-stored instructions which may be stored in memory 166 and which enable the processor 164 to control the switching circuit 168 (e.g., to terminate power to one or more auxiliary-rated loads 118 based upon determining a minimum risk condition (MRC), as will be described in detail below).

The memory 166 may include any non-transitory computer usable or readable medium, which may include one or more storage devices or articles. Exemplary non-transitory computer usable storage devices include conventional computer system RAM (random-access memory), ROM (read-only memory), EPROM (erasable programmable ROM), EEPROM (electrically erasable programmable ROM), as well as any other volatile or non-volatile media. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, compact disc read-only memory (CD-ROM), a digital video disc (DVD), any other optical medium, paper tape, any other physical media with patterns of holes, random-access memory (RAM), programmable read-only memory (PROM), erasable programmable read-only memory (EPROM), electrically erasable programmable read-only memory (EEPROM), any other flash memory, any other memory chip or cartridge, or any other medium from which a computer can read. As discussed above, the memory 166 may store one or more computer program products which may be embodied as software, firmware, or the like.

The AV computer 162 may transmit and receive data through a communications network (not shown), such as a controller area network (CAN) bus, Ethernet, WiFi, local interconnect network (LIN), onboard diagnostics connector (OBD-II), and/or by any other wired or wireless communications network.

The AV computer 162 may receive data from sensors. The sensors may provide data about operation of the vehicle 104, for example, wheel speed, wheel orientation, and engine and transmission data (e.g., temperature, fuel consumption, etc.). In some examples, the sensors may detect location and/or orientation of the vehicle 104 (e.g., ultrasonics 148). For example, the sensors may include global positioning system (GPS) sensors; accelerometers, such as piezo-electric or microelectromechanical systems (MEMS); gyroscopes, such as rate, ring laser, or fiber-optic gyroscopes; inertial measurements units (IMU); and magnetometers. The sensors may detect the external world, e.g., objects and/or characteristics of surroundings of the vehicle 104, such as other vehicles, road lane markings, traffic lights and/or signs, pedestrians, etc. For example, the sensors may include radar sensors, scanning laser range finders, light detection and ranging (LIDAR) loads, and image processing sensors such as cameras. The sensors may include communications devices, for example, vehicle-to-infrastructure (V2I) or vehicle-to-vehicle (V2V) devices.

According to one example, AV computer 162 may further execute instructions to determine a fault condition of the auxiliary-rated load(s) 118. The AV computer 162 may determine the fault condition based on measuring current draw of each of the auxiliary-rated load(s) 118. The current draw may be measured, for example, using one or more embedded current sensors 119 (having communication connection(s) to the AV computer 162 (not shown)). The fault condition may be power-related, such as a short circuit fault, an open circuit fault, etc. The fault condition may include a single-point fault, multi-point fault (e.g., requiring at least two faults to result in a failure), etc. In response to determining a fault condition of the auxiliary-rated load(s) 118, the AV computer 162 may selectively actuate the switching circuit 168 to terminate power to the auxiliary-rated load(s)

118. Terminating power to the auxiliary-rated load(s) 118 preserves the respective ASIL ratings (e.g., ASIL-B) of the ASIL-rated loads 120.

Additionally, or alternatively, AV computer 162 may further execute instructions to determine a fault condition of the power converter 134. The AV computer 162 may determine the fault condition by monitoring voltage of the power converter 134. The voltage may be measured, for example, using an embedded voltage sensor 135 (having a communication connection to the AV computer 162 (not shown)). The fault condition of the power converter may be power-related and may include, for example, an open circuit fault condition that causes the power converter 134 to become unavailable and no longer provide sufficient voltage to power the hybrid power network 112. The fault condition may include a single-point fault, multi-point fault (e.g., requiring at least two faults to result in a failure), etc. In response to determining the fault condition of the power converter 134, the AV computer 162 may selectively actuate the switching circuit 168 to terminate power to the auxiliary-rated load(s) 118. Terminating power to the auxiliary-rated load(s) 118 preserves the respective ASIL ratings (e.g., ASIL-B) of the ASIL-rated loads 120 and concurrently achieves power-load balancing between power networks 110, 112, 114 within a predetermined threshold (e.g., less than 220 amps).

In response to determining a fault condition of the auxiliary-rated load(s) 118 and/or a fault condition of the power converter 134, the AV computer 162 may place the vehicle 104 in a minimal risk condition (MRC). According to the National Highway Traffic Safety Administration (NHTSA) and the SAE guidelines, "'Minimal risk condition' means low-risk operating condition that an automated driving system automatically resorts to either when a system fails or when the human driver fails to respond appropriately to a request to take over the dynamic driving task." According to one example, a fault condition leading to an MRC is a low voltage power fault (e.g., on bus 138). According to another example, a fault condition leading to an MRC is a fault of the AV computer 162. Table 1, shown in FIG. 6, illustrates fault conditions leading to MRCs having differing severities (e.g., MRC 2A, MRC 2B, MRC 3A, and MRC 3B, defined in accordance with ISO 26262). In addition, Table 1 illustrates some example responses once AV computer 162 determines to put the vehicle 104 in an MRC (e.g., initiating a handover to the human driver or autonomously driving the vehicle 104 to a roadside (e.g., stopping the vehicle 104 outside active lanes of traffic)). Memory 166 may store instructions enabling computer 162 to identify a fault condition leading to an MRC, as well as determine suitable instructions for responding to the identified fault condition to put the vehicle 104 in an MRC (e.g., in a table, data array, or the like).

While the ASIL-rated loads 120 include the anti-lock braking system 154, the power steering control module 156, the object detection maintenance module 158, the autonomous vehicle system 160, and the AV computer 162, other examples of ASIL-rated loads exist.

According to the example shown in FIG. 3A, the switching circuit 168 may comprise a plurality of switches 168a, 168b, 168c, 168d, 168e, 168f, 168g, each of which may be used to control power to a respective auxiliary-rated load(s) 118 (e.g., switches 168a-168g corresponding to auxiliary-rated loads 140-152, respectively). More particularly, each of switches 168a-168g may be interposed between bus 138 and respective auxiliary-rated loads 140-152. Non-limiting examples of switches 168a-168g include a field-effect transistor (FET), a metal oxide semiconductor field-effect transistor (MOSFET), an insulated gate bipolar transistor (IGBT), a relay, or any other suitable power electronics. By way of illustration (using switch 168a to illustrate), if the switch 168a were a MOSFET (comprising a source, a drain, and a gate), then for example, the source may be coupled to the DAT 140, the drain may be coupled to bus 138, and the gate may be coupled to one of the ASIL-rated loads 120 (e.g., to AV computer 162).

As will be explained more below, the switching circuit 168 may be used to terminate power to all of the auxiliary-rated load(s) 118 in response to a fault condition of one or more of the auxiliary-rated load(s) 118 and/or a fault condition of the power converter 134. For example, AV computer 162 may actuate a single command and terminate power to all of the auxiliary-rated load(s) 118 in response to a fault condition of one of the auxiliary-rated load(s) 118 and/or a fault condition of the power converter 134. In this instance, LV power may continue to be delivered to the ASIL-rated loads 120 to preserve the desired ASIL rating.

Figure 3B:
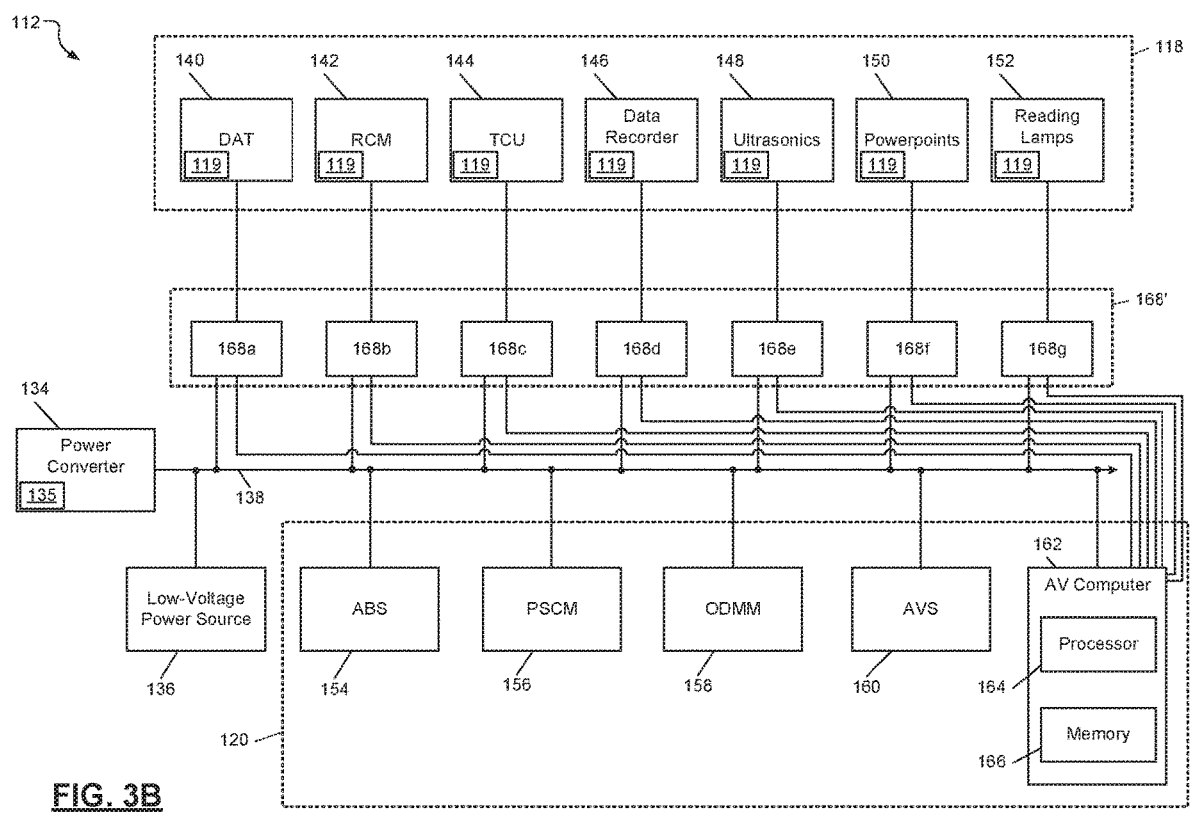
FIG. 3B is a schematic diagram of another example hybrid power network.

Turning to FIG. 3B, another example of a switching circuit is shown (e.g., switching circuit 168'). In this example, the arrangement (and interposition) of the switches 168a-168g may be identical; however, each switch 168a-168g may have an individual connection to AV computer 162. In this manner, computer 162 may selectively terminate power to one or more auxiliary-rated loads 118. As used herein, 'selectively terminate' refers to terminating power to an auxiliary-rated load via only one switch or terminating power to multiple auxiliary-rated loads via one or more switches.

Figure 3C:
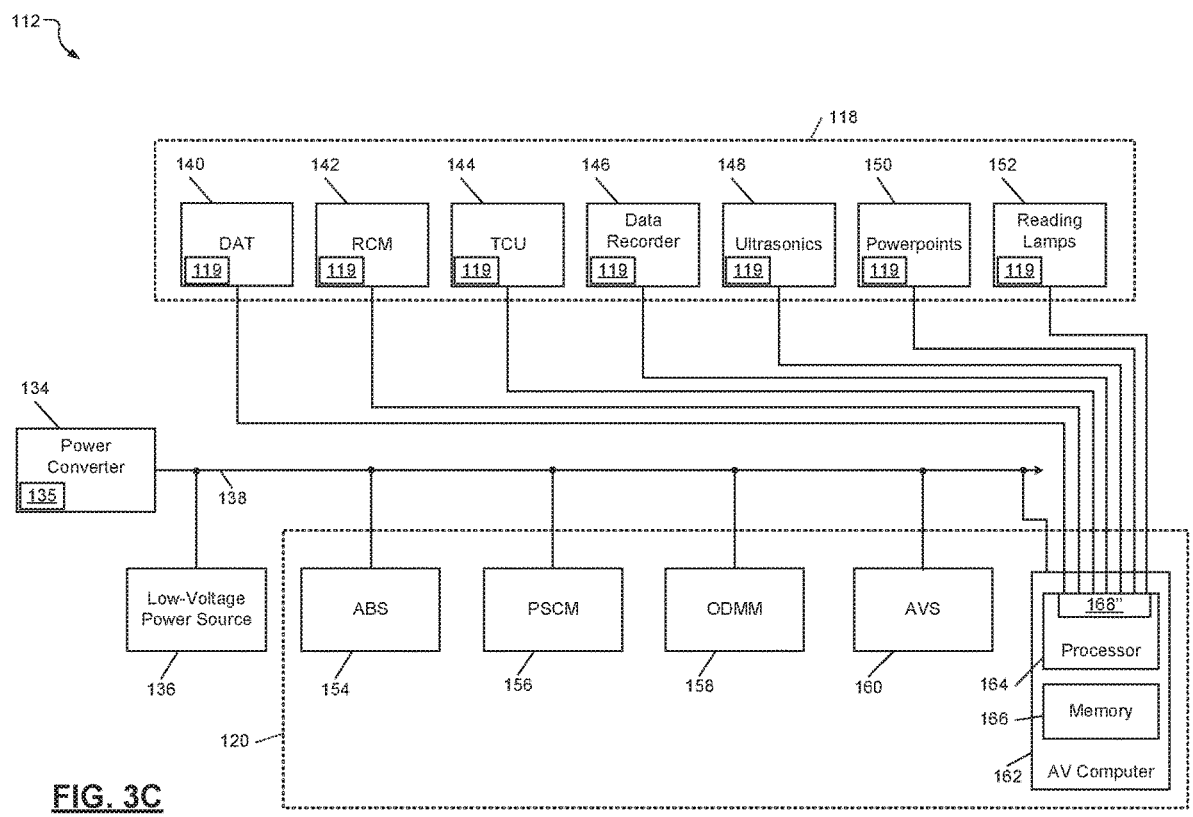
FIG. 3C is a schematic diagram of yet another example hybrid power network.

Turning now to FIG. 3C, another example of a switching circuit is shown (e.g., switching circuit 168"). Switching circuit 168" may be any control circuitry, software instructions, a combination thereof, or the like within processor 164; e.g., no hardware switches 168a-168g may be interposed between the auxiliary-rated loads 118 and the bus 138. Instead, switching circuit 168", via processor 164, may communicate with a processor or processing circuit in each of the auxiliary-rated load 118 and selectively terminate power thereto. For example, the switching circuit 168" may deactivate the respective auxiliary-rated load via an enable (e.g., digital '0' or '1').

Figure 3D:
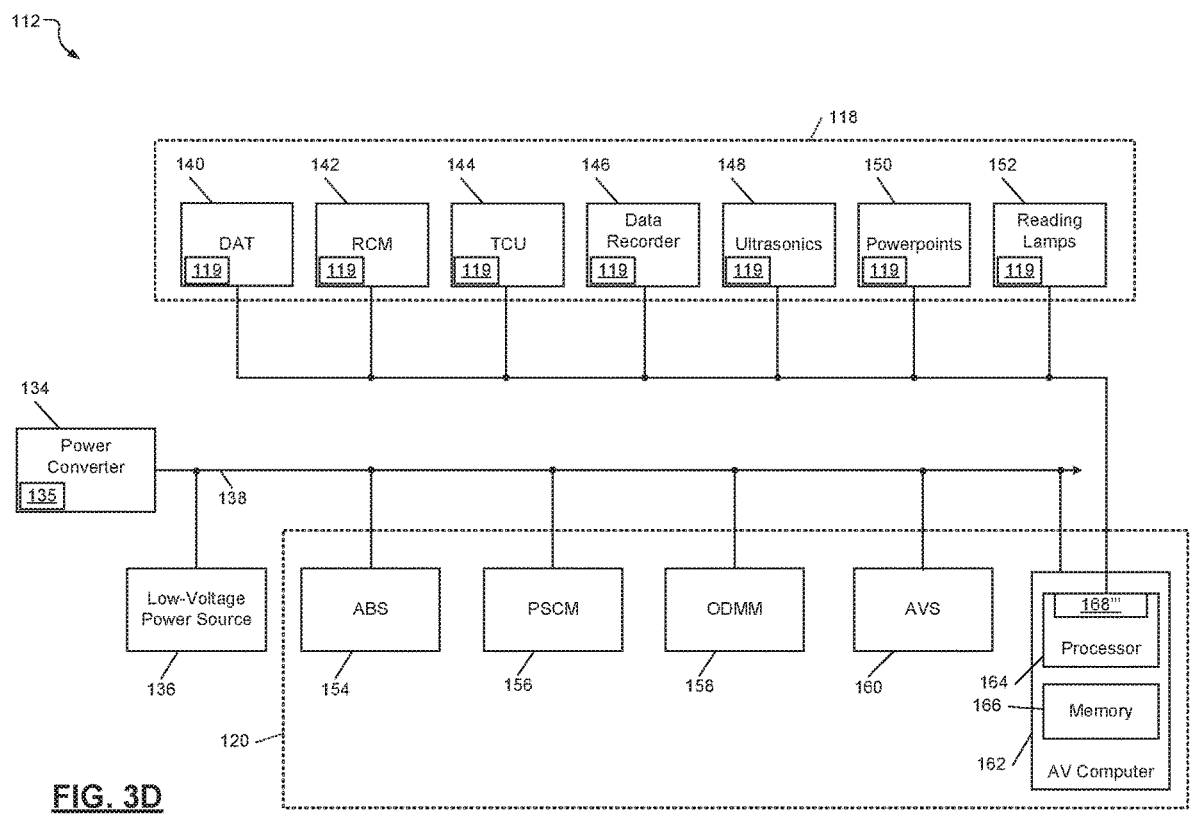
FIG. 3D is a schematic diagram of yet another example hybrid power network.

Turning now to FIG. 3D, another example of a switching circuit is shown (e.g., switching circuit 168'''). Switching circuit 168''' may be similar to that shown in FIG. 3C and described above—except that switching circuit 168''' may be connected to all auxiliary-rated loads 118 via a single connection. In this manner, when switching circuit 168''' is actuated, power to all auxiliary-rated loads 118 is terminated.

Figure 4:
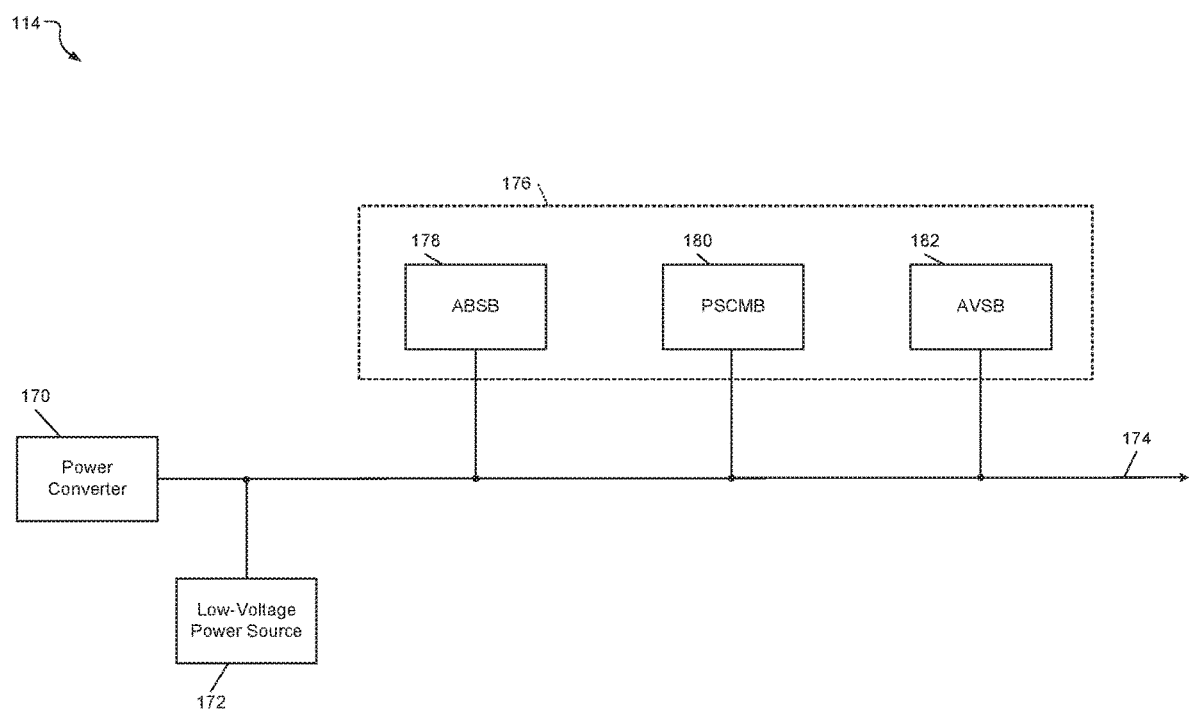
FIG. 4 is a schematic diagram of an example redundant power network.

Turning now to FIGS. 1 and 4, the redundant power network 114 may comprise a power converter 170 coupled to the HV power source 108. Power converter 170 further may be coupled to a LV power source 172 via a bus 174 that also provides power to one or more ASIL-rated loads 176. The redundant power network 114 may be redundant of the hybrid power network 112. In at least one example, the power converter 170 may be identical to the power converter 122, except that the power converter 170 is part of redundant power network 114 (not base power network 110); therefore, it will not be re-explained here.

Similarly, LV power source 172 may be the same as LV power source 124, except that the LV power source 172 is part of redundant power network 114 (not base power network 110); therefore, it will not be re-explained here. The LV power source 172 may have a voltage rating similar to LV power source 124. Similarly, in at least one example, bus 174 may be identical to the bus 126, except that the bus 174 is part of redundant power network 114 (not base power network 110); therefore, it will not be re-explained here.

The ASIL-rated loads 176 are powered via the DC low-voltage delivered over the bus 174. According to one example, the ASIL-rated loads 176 are redundant of the ASIL-rated loads 120; therefore, the ASIL-rated loads 176 have the same ASIL rating as the ASIL-rated loads 120. Similar to the ASIL-rated loads 120, one of the ASIL-rated loads 176 controls at least one of steering, braking, or a combination thereof. Non-limiting examples of ASIL-rated loads 176 include an anti-lock brake system backup (ABSB) 178, a power steering control module backup (PSCMB) 180, and an autonomous vehicle system backup (AVSB) 182.

The anti-lock brake system backup 178 is redundant of the anti-lock braking system 154 and operates when the anti-lock braking system 154 is unavailable (e.g., due to a fault condition). The power steering control module backup 180 is redundant of the power steering control module 156 and operates when the power steering control module 156 is unavailable (e.g., due to a fault condition). The autonomous vehicle system backup 182 is redundant of the autonomous vehicle system 160 and operates when the autonomous vehicle system 160 is unavailable (e.g., due to a fault condition).

It will be appreciated that the ASIL-rated loads of the hybrid power network 112 (e.g., ASIL-B) and the ASIL-rated loads of the redundant power network 114 (e.g., ASIL-B) collectively may result in an ASIL-D rating of the hybrid and redundant power networks 112, 114.

Figure 5:
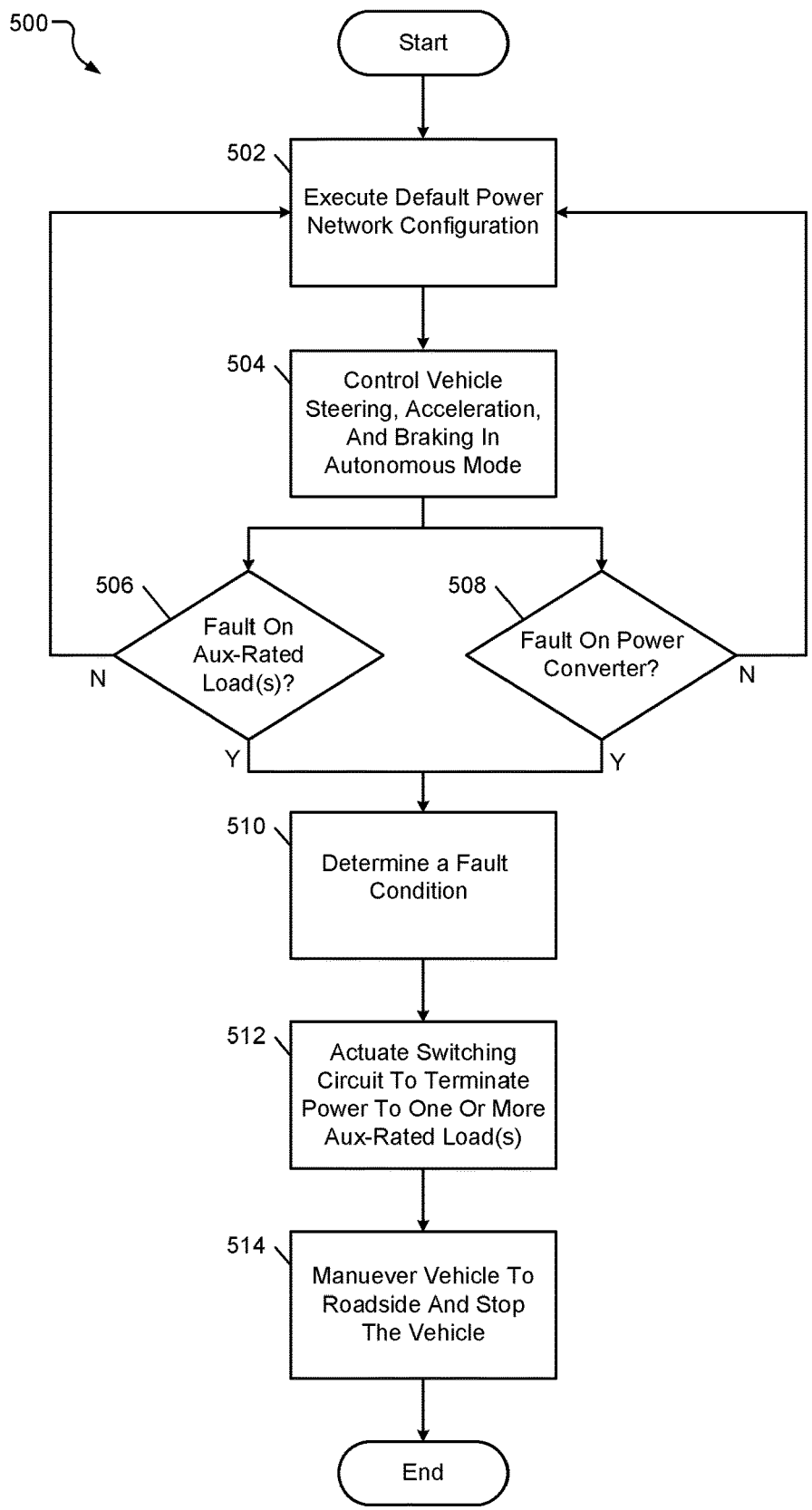
FIG. 5 is a process flow diagram of an example process for determining a fault condition and placing a vehicle in a minimal risk condition (MRC).

Turning now to FIG. 5, a process flow diagram illustrating an exemplary process 500 for operating hybrid power network 112. The process 500 may include determining a fault condition of the auxiliary-rated load(s) 118 (and/or determining a fault condition of the power converter 134) and placing the vehicle 104 in a MRC in order to preserve the ASIL rating of the ASIL-rated loads 120. In the example that follows, loads 120 are ASIL-B rated loads; however, this is merely an example.

The process 500 begins at block 502 where the power networks 110, 112, 114 are executed in a default configuration. In the default configuration, the auxiliary-rated load(s) 118 and the power converter 134 are operating normally without any fault conditions.

At block 504, the vehicle 104 is operating in at least one of a plurality of autonomous modes. In autonomous mode, one of the ASIL-rated loads 120 controls at least one of steering, acceleration, braking, or a combination thereof. In at least one example, vehicle 104 is operating in a fully autonomous mode; however, this is not required.

At block 506, AV computer 162 may determine whether a fault condition has occurred to at least one of the auxiliary-rated load(s) 118. For example, a fault condition may be determined based on measuring current draw of each of the auxiliary-rated load(s) 118. If block 506 is true, the process 500 continues to block 510; otherwise, the process 500 returns to block 502.

At block 508, the process 500 may determine whether a fault condition has occurred at the power converter 134. For example, a fault condition may be determined by monitoring voltage of the power converter 134. If block 508 is true, the process 500 continues to block 510; otherwise, the process 500 returns to block 502.

At block 510 (which may follow either block 506 or block 508), the AV computer 162 may determine the fault condition leading to a minimal risk condition (MRC), as described above, e.g., in Table 1. For example, processor 164 may determine a low voltage power fault on bus 138. According to one example, this fault may be a demand for current which exceeds a predetermined threshold (e.g., more than 220 Amps), wherein the threshold defines or is associated with a current limit of the power converter 134, another power converter (e.g., 170), the high-voltage power source 108, or a combination thereof. For example, exceeding this threshold may be due to an electrical fault condition of one of the auxiliary-rated loads 118, operation requiring full power of one or more of the auxiliary-rated loads 118, or the like. According to another example, processor 164 may determine a low voltage power fault that results from a fault condition of the power converter 134 (e.g., power converter 134 delivers current above or below a predetermined threshold, and/or power converter provides an output voltage that is above or below a predetermined threshold. Other examples also exist.

At block 512, the AV computer 162 may actuate the switching circuit 168 to terminate power to one or more auxiliary-rated load(s) 118 based on the fault condition determined in block 510. Actuation of the switching circuit 168 may preserve the ASIL-rating (e.g., ASIL-B) of the power network 112. As discussed above, in at least one example, AV computer 162 may terminate power to all auxiliary-rated loads 118 concurrently. Or in another example, AV computer 162 may selectively terminate power to the auxiliary-rated load(s) 118. In the latter example, the AV computer 162 may selectively actuate one or more of switches 168a-168g associated with the faulty auxiliary-rated load(s) 118.

At block 514, the AV computer 162 further may put the vehicle 104 in the MRC by maneuvering vehicle 104 to a roadside and/or bringing the vehicle 104 to a stop (e.g., under full autonomous control). In other examples, the AV computer 162 may hand-over control to a human user (e.g., exiting a fully autonomous mode). Thereafter, process 500 may end or, alternatively, process 500 may return and repeat block 502.

While FIG. 5 illustrates block 512 following block 510, in at least one example, blocks 514 may initiate and/or occur before block 512, or blocks 512 and 514 may occur at least partially concurrently.

Other examples exist. In one example, the AV computer 162 may be two or more separate computers on the hybrid power network 112, wherein at least one of the two or more computers controls the switching circuit 168.

In another example, any other suitable ASIL-rated loads 120, 176 may actuate the switching circuit 168, including the anti-lock braking system 154, the power steering control module 156, the object detection maintenance module 158, the autonomous vehicle system 160, the anti-lock brake system backup 178, the power steering control module backup 180, and/or the autonomous vehicle system backup 182.

Thus, there has been described a vehicle power network that includes a hybrid power network (e.g., comprising auxiliary-rated loads and ASIL-rated loads). An ASIL-rated computer of the hybrid power network may control power termination to the auxiliary-rated loads so that an ASIL rating of the ASIL-rated loads may be preserved.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. Many modifications and variations of the present disclosure are possible in light of the above teachings, and the disclosure may be practiced otherwise than as specifically described.

What is claimed is:

1. A vehicle power network, comprising:
   a hybrid power network comprising a bus, an automotive safety integrity level (ASIL)-rated load, and an auxiliary load; and a base power network comprising additional auxiliary-rated loads;
the bus providing power to the ASIL-rated load and the auxiliary-rated load,
the ASIL-rated load, comprising a processor and memory storing instructions executable by the processor, the instructions comprising, to:
in response to determining a fault condition, selectively terminate power to the auxiliary-rated load; and
the hybrid power network and the base power network being load-balanced within a predetermined threshold.

2. The vehicle power network of claim 1, wherein the ASIL-rated load controls vehicle steering or vehicle braking.

3. The vehicle power network of claim 1, wherein the ASIL-rated load receives sensor data from at least one of a LIDAR sensor, a camera sensor, and a radar sensor; and uses the sensor data to control an autonomous mode of a vehicle.

4. The vehicle power network of claim 1, wherein instructions further comprise: based on the fault condition, controlling a vehicle to a stop.

5. The vehicle power network of claim 1, further comprising a power converter that converts voltage from a first direct current voltage to a second direct current voltage.

6. The vehicle power network of claim 1, further comprising a second ASIL-rated load connected to the bus of the hybrid power network, and a redundant power network that provides redundant power to a third ASIL-rated load of the hybrid power network during a single-point fault, the third ASIL-rated load being a backup of the second ASIL-rated load.

7. The vehicle power network of claim 1, wherein the instructions further comprise, actuating a switch to terminate power to the auxiliary-rated load.

8. The vehicle power network of claim 1, wherein the determining the fault condition is based on at least one of (i) a fault condition of the auxiliary-rated load, and (ii) a fault condition of a power converter.

9. The vehicle power network of claim 8, further comprising:
a current sensor that measures current draw of the auxiliary-rated load,
wherein the instructions further comprise: based on the current draw, determine the fault condition of the auxiliary-rated load.

10. A vehicle power network, comprising:
a bus providing power to:
a plurality of auxiliary-rated loads each coupled to the bus via a different switch, one of the auxiliary-rated loads controlling vehicle acceleration;
a first automotive safety integrity level (ASIL)-rated load that controls vehicle steering or vehicle braking; and
a second ASIL-rated load that is programmed to: determine a fault condition; and then, actuate at least one of the switches to terminate power to a corresponding one of the plurality of auxiliary-rated loads.

11. The vehicle power network of claim 10, wherein the second ASIL-rated load is programmed to: receive sensor data from at least one of a LIDAR sensor, a camera sensor, and a radar sensor; and use the sensor data to control an autonomous mode of a vehicle.

12. The vehicle power network of claim 10, wherein the second ASIL-rated load is programmed to, in response to determining the fault condition, control a vehicle to a stop.

13. The vehicle power network of claim 10, further comprising a power converter that converts voltage from a first direct current voltage to a second direct current voltage.

14. The vehicle power network of claim 10, further comprising a hybrid power network comprises the bus, the plurality of auxiliary-rated loads, the first ASIL-rated load, the second ASIL-rated load, and at least one of the switches, wherein the vehicle power network further comprises a base power network comprising additional auxiliary-rated loads, wherein the hybrid power network and the base power network are load-balanced within a predetermined threshold.

15. The vehicle power network of claim 14, further comprising a redundant power network that provides redundant power to a third ASIL-rated load during a single-point fault, the third ASIL-rated load being a backup of the first ASIL-rated load.

16. The vehicle power network of claim 10, wherein the fault condition is determined based on at least one of (i) a fault condition of the plurality of auxiliary-rated loads, and (ii) a fault condition of a power converter.

17. The vehicle power network of claim 16, further comprising:
a plurality of current sensors that measure current draw of a corresponding auxiliary-rated load,
wherein based on the current draw, the second ASIL-rated load is programmed to determine the fault condition of the corresponding auxiliary-rated load.

18. A system of a vehicle, comprising:
a first bus providing power to a first plurality of auxiliary-rated loads; and
a second bus providing power to:
a second plurality of auxiliary-rated loads each coupled to the second bus via a different switch, one of the second plurality of auxiliary-rated loads controlling vehicle acceleration;
a first automotive safety integrity level (ASIL)-rated load that controls vehicle steering or vehicle braking; and
a second ASIL-rated load that is programmed to:
determine a fault condition based on at least one of (i) a fault condition of the second plurality of auxiliary-rated loads, and (ii) a fault condition of a power converter; and
then actuate at least one of the switches to terminate power to a corresponding one of the second plurality of auxiliary-rated loads.

* * * * *